(12) United States Patent
Nagai et al.

(10) Patent No.: US 11,377,317 B2
(45) Date of Patent: Jul. 5, 2022

(54) ROLLER FOR FEEDING AND CONVEYING PAPER SHEETS

(71) Applicant: SYNZTEC CO., LTD., Tokyo (JP)

(72) Inventors: Hiroki Nagai, Yokosuka (JP); Yuichi Shibata, Fujisawa (JP)

(73) Assignee: SYNZTEC CO., LTD., Tokyo (JP)

( * ) Notice: Subject to any disclaimer, the term of this patent is extended or adjusted under 35 U.S.C. 154(b) by 16 days.

(21) Appl. No.: 16/475,284

(22) PCT Filed: May 11, 2018

(86) PCT No.: PCT/JP2018/018337
§ 371 (c)(1),
(2) Date: Jul. 1, 2019

(87) PCT Pub. No.: WO2018/221165
PCT Pub. Date: Dec. 6, 2018

(65) Prior Publication Data
US 2019/0330003 A1 Oct. 31, 2019

(30) Foreign Application Priority Data

Jun. 2, 2017 (JP) .............................. JP2017-110409

(51) Int. Cl.
*B65H 27/00* (2006.01)
*B41J 13/076* (2006.01)
*B65H 3/06* (2006.01)
*B65H 5/06* (2006.01)

(52) U.S. Cl.
CPC ............ *B65H 27/00* (2013.01); *B41J 13/076* (2013.01); *B65H 3/06* (2013.01); *B65H 5/06* (2013.01)

(58) Field of Classification Search
CPC ............ B65H 27/00; B65H 3/06; B41J 13/076
USPC ................................. 492/59, 49, 48
See application file for complete search history.

(56) References Cited

U.S. PATENT DOCUMENTS

| | | | | |
|---|---|---|---|---|
| 5,697,027 A | * | 12/1997 | Takagi | G03G 15/0818 399/279 |
| 6,319,181 B1 | * | 11/2001 | Naoi | B29C 59/165 492/53 |
| 2005/0029693 A1 | | 2/2005 | Noda et al. | |
| 2015/0232295 A1 | | 8/2015 | Imazeki | |

FOREIGN PATENT DOCUMENTS

| | | |
|---|---|---|
| JP | 11-95544 A | 4/1999 |
| JP | 2000-120655 A | 4/2000 |
| JP | 2003-165635 A | 6/2003 |

(Continued)

OTHER PUBLICATIONS

English translation of JP 2000120655 A (Year: 2000).*

(Continued)

*Primary Examiner* — Jason L Vaughan
(74) *Attorney, Agent, or Firm* — Nixon & Vanderhye (57) ABSTRACT

Disclosed is a paper-sheet-feeding/conveying roller having a shaft, and a bi-layer roller material which is formed of an inner layer provided on the shaft and an outer layer. The inner layer provided on the shaft is a foamed elastic layer. The outer layer provided on the foamed elastic layer is a non-foamed elastic layer. The foamed elastic layer is formed of a foamed elastic body of silicone-modified EPDM.

1 Claim, 3 Drawing Sheets

A-A'

(56) References Cited

FOREIGN PATENT DOCUMENTS

| | | |
|---|---|---|
| JP | 2003-292187 A | 10/2003 |
| JP | 4562072 B2 | 8/2010 |
| JP | 2015-151246 A | 8/2015 |

OTHER PUBLICATIONS

English translation of JP 2003165635 A (Year: 2003).*
International Search Report, dated Aug. 7, 2018, from corresponding PCT application No. PCT/JP2018/018337.

* cited by examiner

ROLLER FOR FEEDING AND CONVEYING PAPER SHEETS

TECHNICAL FIELD

The present invention relates to a roller for feeding or conveying a paper sheet (hereinafter referred to as a paper-sheet-feeding/conveying roller) which is employed for feeding and conveying a paper sheet in various office automation (OA) apparatuses such as a copier, a facsimile, and various printers; other printers; financial terminal machines; automatic ticket gates; etc.

BACKGROUND ART

Demand has arisen for paper-sheet-feeding/conveying rollers having high conveying performance and excellent wear resistance which are employed in various office automation (OA) apparatuses such as a copier, a facsimile, and various printers; other printers; financial terminal machines; automatic ticket gates; etc. Under such circumstance, the paper-sheet-feeding/conveying rollers are formed of a rubber material having high mechanical strength and high friction coefficient. Examples of the rubber material include EPDM (ethylene-propylene-diene rubber), chlorinated polyethylene rubber, silicone rubber, and polyurethane rubber.

There has been proposed a paper-sheet-feeding/conveying roller having a bi-layer structure (hereinafter referred to as a "bi-layer roller") formed of EPDM (see, for example, Patent Documents 1 to 3). The bi-layer roller has a shaft and, provided thereon, a material having a bi-layer configuration including an inner layer and outer layer (hereinafter referred to as a "bi-layer roller material"). One specific example of the bi-layer roller material consists of an inner layer formed of foamed EPDM (i.e., a foamed elastic layer) provided on a shaft, and an outer layer formed of non-foamed EPDM (i.e., a "non-foamed elastic layer") provided on the foamed elastic layer. Notably, the term "non-foamed EPDM" is referred to simply as "EPDM," and the term "non-foamed elastic layer" as "elastic layer."

When such a bi-layer roller is applied to a paper-sheet-feeding/conveying roller for various OA apparatuses, the bi-layer roller comes into contact with a counter member (e.g., a mono-layer roller or a bi-layer roller) along the circumferential direction. The contact width (nip width) with the counter member increases with an increase in deformation (deformation amount, nip amount) of the bi-layer roller material under a specific pressure load. Under such conditions, paper sheets of non-limited types can be fed or conveyed.

PRIOR ART DOCUMENTS

Patent Documents

Patent Document 1: Japanese Patent Application Laid-Open (kokai) No. 2003-292187
Patent Document 2: Japanese Patent No. 3932255
Patent Document 3: Japanese Patent No. 4562072

SUMMARY OF THE INVENTION

Problems to be Solved by the Invention

However, under severe feeding or conveying conditions (in particular, load and speed), the inner layer (i.e., the foamed elastic layer) receives an excessive load, possibly being damaged, and breakage due to the damage may provide undesired space between the shaft and the bi-layer roller material. In this case, idle running of the roller may occur.

The present invention has been conceived to solve the aforementioned conventional technical problems. Thus, an object of the present invention is to provide a paper-sheet-feeding/conveying roller which has excellent mechanical strength and durability to ensure use under severe feeding and conveying conditions.

Means for Solving the Problems

In order to attain the above object, a first mode of the present invention is directed to a paper-sheet-feeding/conveying roller having a shaft, and a bi-layer roller material which is formed of an inner layer provided on the shaft and an outer layer, wherein the inner layer provided on the shaft is a foamed elastic layer; the outer layer provided on the foamed elastic layer is a non-foamed elastic layer; and the foamed elastic layer is formed of a foamed elastic body of silicone-modified EPDM.

A second mode of the paper-sheet-feeding/conveying roller of the present invention is a specific embodiment of the paper-sheet-feeding/conveying roller of the first mode, wherein the non-foamed elastic layer contains EPDM.

Effects of the Invention

The present invention enables provision of a paper-sheet-feeding/conveying roller which has excellent mechanical strength and durability to ensure use under severe feeding and conveying conditions.

MODES FOR CARRYING OUT THE INVENTION

With reference to the attached drawings, an embodiment of the paper-sheet-feeding/conveying roller of the present invention will be described. The following embodiment is given for only illustrating the paper-sheet-feeding/conveying roller of the present invention, and those skilled in the art may modify the embodiment in any range within the scope of the paper-sheet-feeding/conveying roller of the present invention. In each drawing, for the purpose of illustration, members of the roller may be drawn in an exaggerated manner in terms of shape, dimension, layer thickness, and relative location. In the specification, the term "on" indicating the locational relationship between members does not refer limitedly to "directly on." For example, the expression "the foamed elastic layer on the shaft" or "the elastic layer on the foamed elastic layer" does not exclude the case where an optional element intervenes between the shaft and the foamed elastic layer, or between the foamed elastic layer and the elastic layer.

(Paper-Sheet-Feeding/Conveying Roller)

The paper-sheet-feeding/conveying roller according to the embodiment of the present invention may be employed in various office automation (OA) apparatuses such as a copier, a facsimile, and various printers; other printers; financial terminal machines; automatic ticket gates; etc. Particularly, the paper-sheet-feeding/conveying roller is suitably used as rollers for various OA apparatuses such as a paper sheet-feeding roller, a paper sheet-conveying roller, a charge-imparting roller, a development roller, a transfer roller, and a press roller. The present embodiment is a paper-sheet-feeding/conveying roller employed in feeding/conveying a paper sheet in various OA apparatuses.

Figure 1:
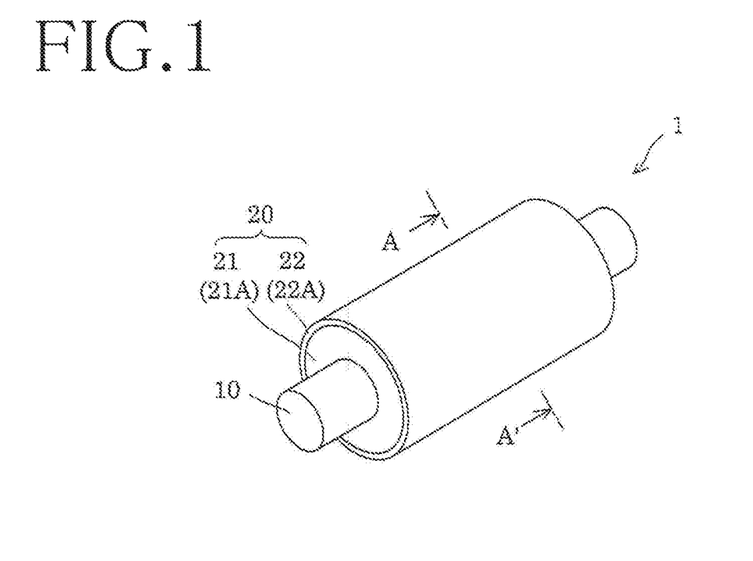
FIG. 1 A perspective view of a paper-sheet-feeding/conveying roller according to an embodiment (structure).
Figure 2:
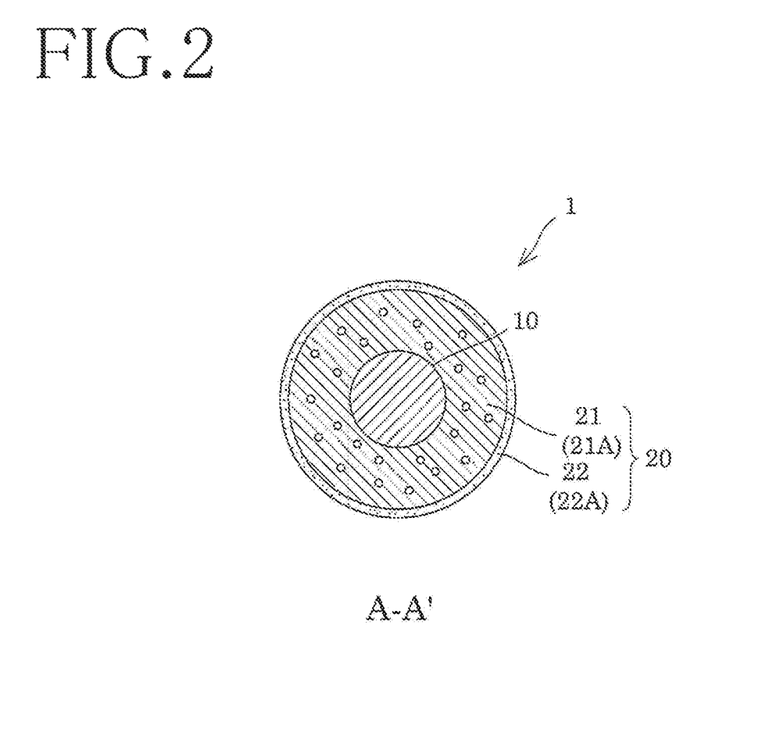
FIG. 2 A cross-sectional view of the roller shown in FIG. 1, cut along line A-A'.

FIG. 1 is a perspective view of a paper-sheet-feeding/conveying roller according to the embodiment (structure), and FIG. 2 is a cross-sectional view of the roller shown in FIG. 1, cut along line A-A'. As shown in the drawings, a paper-sheet-feeding/conveying roller 1 has a shaft 10, and a bi-layer roller material 20 which is formed of an inner layer 21 and an outer layer 22 and which is provided on the shaft 10. The inner layer 21 of the bi-layer roller material 20 is a foamed elastic layer 21A provided on the shaft 10, and the outer layer 22 is an elastic layer 22A provided on the foamed elastic layer 21A. That is, in the paper-sheet-feeding/conveying roller 1, the foamed elastic layer 21A and the elastic layer 22A are sequentially stacked on the shaft 10. Notably, in the paper-sheet-feeding/conveying roller 1, at least one layer may optionally be provided between the shaft 10 and the foamed elastic layer 21A, or between the foamed elastic layer 21A and the elastic layer 22A.

The shaft 10 is formed of a metallic or resin material having excellent thermal conductivity and mechanical strength. No particular limitation is imposed on the material of the shaft 10, and there may be used metallic materials such as SUS alloy, nickel (Ni), nickel alloy, iron (Fe), magnetic stainless steel, and cobalt-nickel (Co—Ni) alloy; and resin materials such as polyimide (PI) resin. The shaft 10 is not limited to any particular shape. The shaft 10 may be hollow or non-hollow.

The foamed elastic layer 21A serving as the inner layer 21 of the bi-layer roller material 20 is formed of a foamed elastic body containing silicone-modified ethylene-propylene-diene rubber (EPDM), so that the roller endures under severe feeding/conveying conditions (particularly heavy load and high speed) to attain high durability. The unvulcanized rubber composition for forming the foamed elastic body essentially contains silicone-modified EPDM, a foaming agent, and a vulcanizing agent. Other than these essential ingredients, the composition may further contain additives such as a foaming aid, a vulcanization aid, a vulcanization accelerator, a rubber enforcing agent, an inorganic filler, a softening agent, an antiaging agent, a process aid, an organic peroxide, a cross-linking aid, a colorant, a dispersant, and a flame-retardant, so long as the effects of the paper-sheet-feeding/conveying roller of the present invention are not impaired. No particular limitation is imposed on the vulcanization method in the embodiment. Other than direct addition of a vulcanizing agent, cross-linking may be performed with electron beam radiation without adding a vulcanizing agent (electron beam cross-linking).

In the specification, silicone-modified EPDM refers to an addition product which is yielded through reaction of SiH group in a silicon compound with a multiple bond of an EPDM molecule (i.e., hydrosilylation), to thereby form an intermolecular bond (i.e., siloxane bond) by the mediation of the silicon compound. In preparation of silicone-modified EPDM, there may be used a catalyst, a reaction promotor, etc. for accelerating addition reaction, and an optional additive in accordance with need.

EPDM is an ethylene propylene diene monomer rubber (EPDM rubber), and a random copolymer of ethylene, propylene, and a diene. Examples of the diene include linear-chain non-conjugated dienes such as 1,4-hexadiene, 3-methyl-1,4-hexadiene, 4-methyl-1,4-hexadiene, 5-methyl-1,4-hexadiene, 4,5-dimethyl-1,4-hexadiene, and 7-methyl-1,6-octadiene; cyclic non-conjugated dienes such as methyltetrahydroindene, 5-ethylidene-2-norbornene, 5-methylene-2-norbornene, 5-isopropylidene-2-norbornene, 5-vinylidene-2-norbornene, 6-chloromethyl-5-isopropenyl-2-norbornene, and dicyclopentadiene; and trienes such as 2,3-diisopropylidene-5-norbornene, 2-ethylidene-3-isopropylidene-5-norbornene, and 2-propenyl-2,2-norbornadiene.

No particular limitation is imposed on the molecular structure of the silicon compound, so long as the silicon compound includes a hydrogen atom directly bonded to a silicon atom (i.e., an SiH group). Any of a linear, a cyclic, and a branched chain silicon compound may be used. Alternatively, a resin thereof having a 3-dimensional network structure may also be used. Yet alternatively, a compound having at least 2, preferably 3 or more SiH groups in the molecule thereof may be used.

Examples of the silicon compound include halosilanes such as trichlorosilane, methyldichlorosilane, dimethylchlorosilane; alkoxysilanes such as trimethoxysilane, triethoxysilane, methyldimethoxysilane, methyldiethoxysilane, phenyldimethoxysilane, and bis(methylethylketoximato) methylsilane; acyloxysilanes such as triacetoxysilane and methyldiacetoxysilane; and ketoximatosilanes such as tris (acetoximato)silane, bis(dimethylketoximato)methylsilane, and bis(cyclohexylketoximato)methylsilane.

As the silicon compound, there may be used an organohydrogenpolysiloxane preferably having in the molecule thereof 2 to 1,000 silicon atoms, particularly preferably 2 to 300 silicon atoms, most preferably 4 to 200 silicon atoms. Examples of such organohydrogenpolysiloxanes include siloxane oligomers such as 1,1,3,3-tetramethyldisiloxane, 1,3,5,7-tetramethyltetracyclosiloxane, and 1,3,5,7,8-pentamethylpentacyclosiloxane; and both-end-trimethylsiloxy-blocked methylhydrogenpolysiloxane, both-end-trimethylsiloxy-blocked dimethylsiloxane-methylhydrogensiloxane copolymer, both-end-silanol-blocked methylhydrogenpolysiloxane, both-end-silanol-blocked dimethylsiloxane-methylhydrogensiloxane copolymer, both-end-dimethylhydrogensiloxy-blocked dimethylpolysiloxane, both-end-dimethylhydrogensiloxy-blocked methylhydrogenpolysiloxane, both-end-dimethylhydrogensiloxy-blocked dimethylsiloxane-methylhydrogensiloxane copolymer, and silicone resin.

The amount of the silicon compound used in silicone-modified EPDM, with respect to 100 parts by weight (unless otherwise specified, the unit "part(s)" refers to "part(s) by weight") of EPDM, 0.1 parts to 100 parts, preferably 0.1 parts to 75 parts, more preferably 0.1 parts to 50 parts, still more preferably 0.2 parts to 30 parts, yet more preferably 0.2 parts to 20 parts, particularly preferably 0.5 parts to 10 parts, most preferably 0.5 parts to 5 parts. When the silicon compound is used under the above conditions, the unvulcanized rubber composition can provide a foamed elastic body which has excellent compression set and moderate cross-linking density, and exhibits excellent mechanical strength and elongation property. In contrast, when the silicon compound is used in an amount less than 0.1 parts, an appropriate cross-linking density failed to be attained, whereas when the silicon compound is used in an amount in excess of 100 parts, production cost increases. Both cases are not preferred.

The unvulcanized rubber composition contains a foaming agent for producing the foamed elastic body. Examples of the foaming agent include inorganic foaming agents such as sodium bicarbonate, sodium carbonate, ammonium bicarbonate, ammonium carbonate, and ammonium nitrite; nitroso compounds such as N,N'-dimethyl-N,N'-dinitrosoterephthalamide and N,N'-dinitrosopentaethylenetetramine; azo compounds such as azodicarbonamide, azobisisobutyronitrile, azocyclohexylnitrile, azodiaminobenzene, and barium azodicarboxylate; sulfonylhydrazide compounds such as benzenesulfonylhydrazide, toluenesulfonylhydrazide, p,p'-oxybis(benzenesulfonylhydrazide), and diphenylsulfone-3,3'-disulfonylhydrazide; and azide compounds such as calcium azide, 4,4-diphenyldisulfonyl azide, and p-toluenesulfonyl azide.

In this embodiment, the foaming rate, the foam cell size (i.e., mean cell size), etc. of the foamed elastic body is regulated by selecting the type of the foaming agent or the amount of the foaming agent used in the composition. The amount of foaming agent, with respect to the entire amount of the unvulcanized rubber composition, is adjusted to 25 wt. % or less. When the foaming agent is used under these conditions, the specific gravity of the foamed elastic body can be adjusted to 0.20 to 0.95, and the foaming ratio to 1.5 to 5.0. The foamed elastic body may have an open cell structure (with air bubbles communicating with one another) or a closed cell structure (with separately present air bubbles). From the viewpoint of vibration absorption performance, the mean cell size of the foamed elastic body is preferably 10 μm or greater.

If needed, the unvulcanized rubber composition may further contain a foaming aid in combination with the foaming agent. The foaming aid can reduce the decomposition temperature at which the foaming agent acts, promote decomposition, and provide cells of uniform size. Examples of the foaming aid include organic acids such as salcylic acid, phthalic acid, stearic acid, and oxalic acid; and urea and derivatives thereof.

Examples of the vulcanizing agent contained in the unvulcanized rubber composition include sulfur and a peroxide. Through selection of the vulcanizing agent to be added, various characteristics can be imparted to the produced foamed elastic body.

In order to promote the action of the vulcanizing agent, the unvulcanized rubber composition may further contain other additives such as inorganic vulcanization aids (e.g., zinc oxide and magnesium oxide) and organic vulcanization aids (e.g., stearic acid and amine). Also, a thiazole-base vulcanization accelerator may be added thereto for shortening the vulcanization time required.

In the unvulcanized rubber composition, an optional rubber material may be blended with silicone-modified EPDM, so long as the effects of the paper-sheet-feeding/conveying roller of the present invention are not impaired. Examples of the optional rubber material include ethylene-α-olefin copolymer rubber such as ethylene-propylene-diene rubber (EPDM) and ethylene-propylene random copolymer (EPR); iroprene-base rubber such as natural rubber (NR) and isoprene rubber (IR); and conjugated diene-base rubber such as butadiene rubber (BR), styrene-butadiene rubber (SBR), acrylonitrile-butadiene rubber (NBR), and chloroprene rubber (CR).

In the case where EPDM as a rubber material is added to silicone-modified EPDM, to thereby form an unvulcanized rubber composition, the amount of EPDM (blend ingredient) is adjusted to 40 wt. % or less with respect to the entire amount of the unvulcanized rubber composition.

In the present invention, a commercial product of silicone-modified EPDM may also be used. Examples of the commercial product of silicone-modified EPDM include SEP rubber (product of Shin-Etsu Chemical Co., Ltd.), and specific product thereof include SEP-1411-U, SEP-1711-U, SEP-1421-U, SEP-1431-U, SEP-363-U, SEPX-719-U, and SEPX-910-U.

The foamed elastic layer 21A, which is formed of a foamed elastic body produced from the aforementioned unvulcanized rubber composition, preferably has such a rubber strength (Asker C) and a thickness that a deformation amount (i.e., a dent amount or a nip amount) under a specific press load is ensured so as to provide the paper-sheet-feeding/conveying roller 1 with a paper-sheet-feeding/conveying property. For example, the rubber strength is 10° to 50°, and the thickness is 2.0 mm or more.

Through provision of the foamed elastic layer 21A, the paper-sheet-feeding/conveying roller 1 can be provided with such a mechanical strength that use of the roller can be ensured under severe feeding/conveying conditions. That is, the roller can be provided with high durability.

Meanwhile, the elastic layer 22A, serving as the outer layer 22 of the bi-layer roller material 20, is formed of a vulcanized product obtained by vulcanizing an unvulcanized rubber composition containing known rubber materials generally used in paper-sheet-feeding/conveying rollers. Examples of the rubber material include EPDM, chlorinated polyethylene rubber, silicone rubber, fluororubber, and polyurethane rubber.

The rubber material of the elastic layer 22A is preferably a material which can easily bond the foamed elastic layer 21A to the elastic layer 22A. That is, the rubber materials of the two layers are preferably the same or have mutual compatibility. When the same rubber material is chosen, an agent such as an adhesive for bonding the foamed elastic layer 21A and the elastic layer 22A is not needed, leading to simplification of production steps and cost reduction. Since the foamed elastic layer 21A contains silicone-modified EPDM, the elastic layer 22A is preferably formed of a rubber material containing the same EPDM.

The elastic layer 22A has such a rubber strength (JIS A hardness) that the paper-sheet-feeding/conveying roller 1 can be provided with a paper-sheet-feeding/conveying property, without impeding deformation of the foamed elastic layer 21A under a press load. The rubber strength is preferably, for example, 15° to 60°. Also, the elastic layer 22A has such a thickness that the foamed elastic layer 21A can be protected to maintain durability of the roller. The thickness is preferably, for example, 0.5 mm to 2.0 mm. Furthermore, the elastic layer 22A has such a roller surface that the paper-sheet-feeding/conveying property of the paper-sheet-feeding/conveying roller 1 does not deteriorate. The roller surface preferably has a surface roughness Rz, for example, of 50 μm to 140 μm.

(Method of Producing Paper-Sheet-Feeding/Conveying Roller)

Figure 3:
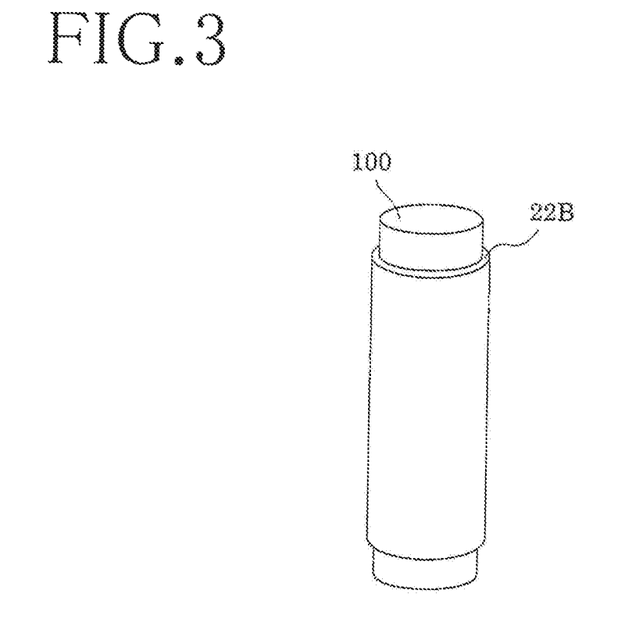
FIG. 3 A perspective view of a paper-sheet-feeding/conveying roller according to an embodiment (production method).
Figure 4:
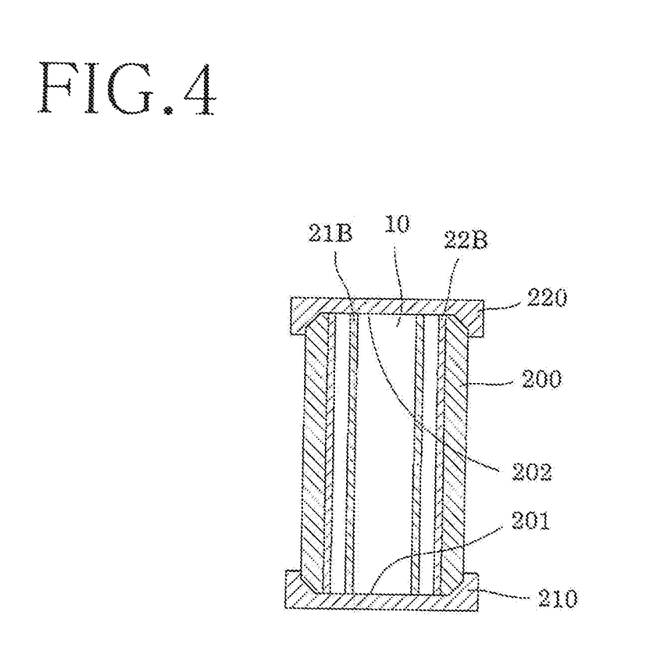
FIG. 4 An axial cross-section of a paper-sheet-feeding/conveying roller according to an embodiment (production method).

With reference to FIGS. 3 and 4, next will be described a method for producing the paper-sheet-feeding/conveying roller 1 shown in FIGS. 1 and 2. However, the belowdescribed described method is an embodiment given only for the purpose of illustration, and the production method should not be limited to the embodiment. In this embodiment, a tube member to serve as the elastic layer 22A is formed to have an inner diameter of interest. Then, the tube member is placed to surround the shaft 10, and an unvulcanized rubber composition for forming a foamed elastic body (i.e., the foamed elastic layer 21A) is placed to cover the shaft 10. The unvulcanized rubber composition is vulcanized and foamed to form the foamed elastic layer 21A, thereby yielding the paper-sheet-feeding/conveying roller 1. Through the production method, there can be produced the paper-sheet-feeding/conveying roller 1 in which the foamed elastic layer 21A and the elastic layer 22A are concentrically provided about the shaft 10.

In an alternative method, a tube member to serve as the elastic layer 22A is placed to surround the shaft 10, and an unvulcanized rubber composition for forming a foamed elastic body (i.e., the foamed elastic layer 21A) is charged into a space therebetween, and the unvulcanized rubber composition is vulcanized and foamed to form the foamed elastic layer 21A, thereby yielding the paper-sheet-feeding/conveying roller 1.

FIG. 3 is a perspective view of a paper-sheet-feeding/conveying roller according to this embodiment (production method). As shown in FIG. 3, the tube member 22B to serve as the elastic layer 22A is formed through extrusion molding. The axis-aligned shaft 100 having a predetermined diameter is coated with the tube member. The assembly is heated to semi-vulcanized, and the tube member 22B is released from the mold.

FIG. 4 is an axial cross-section of a paper-sheet-feeding/conveying roller according to this embodiment (production method). As shown in FIG. 4, a second metal mold 210 is attached to a first metal mold 200 of a cylindrical shape so as to completely cover the bottom surface 210 of the first metal mold 200, and a tube member 22B is placed on the inner surface of the first metal mold 200. Then, a shaft 10 which has been coated with an unfoamed elastic layer 21B (unvulcanized rubber composition) is placed in the first metal mold 200, and the top end 202 of the first metal mold 200 is plugged with a third metal mold 220. The assembly is subjected to as thermal treatment. As a result, the unfoamed elastic layer 21B is caused to be vulcanized and foamed, to thereby form the foamed elastic layer 21A and completely vulcanize the tube member 2B. As a result, the elastic layer 22A is formed, to thereby integrally combine with the other components.

Thereafter, the second metal mold 210 and the third metal mold 220 are removed from the first metal mold 200, whereby the resultant assembly is removed, to thereby yield a compact. The surface of the elastic layer 22A of the molded product is polished to thereby adjust the surface roughness, outer diameter, and variation of the outer diameter. Finally, the paper-sheet-feeding/conveying roller 1 (see FIGS. 1 and 2) is obtained.

(Modification of Paper-Sheet-Feeding/Conveying Roller)

The embodiment of the paper-sheet-feeding/conveying roller of the present invention has been described. However, the essential constitution of the paper-sheet-feeding/conveying roller of the present invention is not limited to the aforementioned embodiment. The paper-sheet-feeding/conveying roller of the present invention is employed for feeding/conveying a paper sheet in various office automation (OA) equipment, various printers, financial terminal machines, automatic ticket gates, etc. Also, the roller of the present invention may also be applied to rollers for OA apparatuses such as a charge-imparting roller, a development roller, a transfer roller, and a press roller. In such a case, the rubber material of the elastic layer, serving as the outer layer of the bi-layer roller material, may be modified in accordance with the use of the roller. In the case where the foamed elastic layer and the elastic layer are formed from different rubber materials, preferably, a bonding layer is provided onto the foamed elastic layer, and an elastic layer is formed by the mediation of the bonding layer, and the two layers are bonded together. In bonding of the two layers, an agent such as an adhesive is selected so as not to affect the paper-sheet-feeding/conveying property and durability of the paper-sheet-feeding/conveying roller.

In an alternative mode of the paper-sheet-feeding/conveying roller of the present invention, a foamed elastic layer serving as the inner layer of the bi-layer roller material is not directly provided on the surface of the shaft and, instead, the rubber-form foamed elastic layer is provided on the surface of the shaft by the mediation of, for example, a thin rubber elastic layer. By the mediation of the thin rubber elastic layer, slippage between the foamed elastic layer and the shaft can be prevented. Notably, when the thin rubber elastic layer is provided on the shaft, preferably, a solution of the rubber material dissolved in the solvent is applied onto the shaft, and then a rubber elastic layer is formed thereon.

In an alternative manner, in the paper-sheet-feeding/conveying roller of the present invention, a foamed elastic layer, serving as the inner layer of the bi-layer roller material, is provided on the shaft, and then the elastic layer serving as the outer layer is provided. Also, so long as the paper-sheet-feeding/conveying property and durability are not impaired, two or more optional elastic layers and foamed elastic layers may be provided.

In accordance with need, in the paper-sheet-feeding/conveying roller of the present invention, the foamed elastic layer or the elastic layer of the bi-layer roller material may be provided with electrically insulating property or electrical conductivity. In the case where conductivity is provided, static discharge, which would otherwise occur during feeding/conveying of a paper sheet, can be prevented. In the case where conductivity is provided, a particulate electrically conductive material such as carbon or metal, or an ion conducting agent may be added to the aforementioned elastic material. Also, in accordance with need, one or more particulate electrically conductive materials and ion conducting agents may be added in combination.

No particular limitation is imposed on the form of carbon to be added, so long as the carbon can impart electrical conductivity to the foamed elastic layer and the elastic layer. Examples of the form of carbon include powder, fiber, thread, needle, and rod. Examples of such carbon products include carbon black, carbon fiber, carbon atom cluster, and a mixture thereof. Examples of the carbon fiber include acrylic fiber carbon fiber (PAN), pitch carbon fiber (PITCH), carbon fiber-reinforced plastics (FRP), and a mixture thereof. Examples of the carbon atom cluster include carbon nanotube and a mixture thereof.

Examples of the metal include nickel (Ni), copper (Cu), phosphorus (P), cobalt (Co), iron (Fe), manganese (Mn), gold (Au), and an alloy or oxide thereof. Examples further include these species thereof in the form of powder, fiber, thread, needle, rod, etc. Alternatively, the aforementioned metal may be applied to particles of an inorganic filler such as silica.

Examples of the ion conducting agent include an organic salt, an inorganic salt, a metal complex, and an ion liquid. Examples of the organic salt include sodium trifluroacetate, and examples of the inorganic salt include lithium perchlorinate. Examples of the metal complex include haloferrate-ethylene glycol. A more specific example is agent disclosed in Japanese patent No. 3655364. Meanwhile, the ion conductive liquid is defined as a molten salt (molten salt as an ambient temperature) preferably having a melting point of 70° C. or lower, more preferably 30° C. or lower. More specifically, these ion conductive agents are disclosed in Japanese Patent Application Laid-Open (kokai) No. 2003-202722.

EXAMPLES

The present invention will next be described in more detail by way of example, which should not be construed as limiting the invention thereto.

Example 1

In Example 1, a paper-sheet-feeding/conveying roller 1 shown in FIGS. 1 and 2 was produced through a production method shown in FIGS. 3 and 4. Firstly, an unvulcanized rubber composition $C_1$ for forming a tube member 22B to serve as an elastic layer 22A was prepared. The unvulcanized rubber composition $C_1$ for forming a tube member 22B contained EPDM1 and EPDM2 as two rubber materials, a vulcanizing agent (precipitated sulfur), and other additives. EPDM1 was JSR EP-98 (product of JSR Corporation), and EPDM2 was Mitsui EPT-X-3042EH (product of Mitsui Chemicals, Inc.).

Then, as shown in FIG. 3, the thus-prepared unvulcanized rubber composition $C_1$ was extruded in advance to form the tube member 22B, which was applied onto an axis-aligned metallic shaft 100 having a predetermined diameter. The tube member was heated for semi-vulcanizing the rubber composition. The tube member 22B was then released from the metallic shaft.

Separately, an unvulcanized rubber composition $C_2$ for forming an unfoamed elastic layer 21B to serve as a foamed elastic layer 21A was prepared. The unvulcanized rubber composition $C_2$ for forming an unfoamed elastic layer 21B contained silicone-modified EPDM as a rubber material, a foaming agent, a vulcanizing agent (precipitated sulfur), and other additives. The silicone-modified EPDM was SEPX-719-U (product of Shin-Etsu Chemical Co., Ltd.), and the foaming agent was Vinyfor AC #R (product of Eiwa Chemical Ind. Co., Ltd.). The silicone-modified EPDM was contained in an amount of 100 parts (89.74 wt. %), the foaming agent 3 parts (2.69 wt. %), and the vulcanizing agent 0.72 parts (0.65 wt. %), with respect to the entire amount (111.43 parts) of the unvulcanized rubber composition $C_2$.

Then, as shown in FIG. 4, a second metal mold 210 was placed in a cylindrical first metal mold 200 so as to cover the bottom surface 210 of the metal mold 200, and a tube member 22B was placed in the first metal mold 200 so as to cover the inner surface of the metal mold 200. Subsequently, a shaft 10 about which the unfoamed elastic layer 21B formed of the unvulcanized rubber composition $C_2$ was wound was placed inside the first metal mold 200. The upper end 202 of the first metal mold 200 was closed with a third metal mold 220, and the rubber composition was thermally treated. As a result, the unfoamed elastic layer 21B was vulcanized and foamed, to thereby form the foamed elastic layer 21A, and the tube member 22B was completely vulcanized, to thereby form the elastic layer 22A. Thus, the foamed elastic layer 21A and the elastic layer 22A were integrally formed.

Thereafter, the second metal mold 210 and the third metal mold 220 were removed from the first metal mold 200, whereby the integrally formed product was isolated. The surface of the elastic layer 22A of the thus-obtained molded product was polished so as to regulate the surface roughness, outer diameter, and run out, whereby the paper-sheet-feeding/conveying roller 1 shown in FIGS. 1 and 2 was yielded. The bi-layer roller material 20 of the thus-obtained paper-sheet-feeding/conveying roller 1 was found to have an outer diameter φ of 16.2 mm, an inner diameter φ of 9.0 mm, and a width of 15.0 mm. The rubber hardness of the elastic layer 22A was 25°, determined by means of a durometer (type A).

Example 2

In Example 2, the procedure of Example 1 was repeated, except that silicone-modified EPDM and EPDM were used as rubber materials, and a different silicone-modified EPDM was used, to thereby produce the paper-sheet-feeding/conveying roller 1. The silicone-modified EPDM was SEPX-910-U (product of product of Shin-Etsu Chemical Co., Ltd.), and the EPDM was Mitsui EPT-X-4010M (product of Mitsui Chemicals, Inc.). The silicone-modified EPDM was contained in an amount of 90 parts (83.00 wt. %), EPDM 10 parts (9.22 wt. %), the foaming agent 3 parts (2.77 wt. %), and the vulcanizing agent 0.72 parts (0.66 wt. %), with respect to the entire amount (108.43 parts) of the unvulcanized rubber composition $C_2$.

Example 3

In Example 3, the procedure of Example 1 was repeated, except that a different silicone-modified EPDM was used as a rubber material, to thereby produce the paper-sheet-feeding/conveying roller 1. The silicone-modified EPDM was SEPX-910-U (product of Shin-Etsu Chemical Co., Ltd.). The silicone-modified EPDM was contained in an amount of 100 parts (92.23 wt. %), the foaming agent 3 parts (2.77 wt. %), and the vulcanizing agent 0.72 parts (0.66 wt. %), with respect to the entire amount (108.43 parts) of the unvulcanized rubber composition $C_2$.

Example 4

In Example 4, the procedure of Example 1 was repeated, except that a different silicone-modified EPDM was used as a rubber material, to thereby produce the paper-sheet-feeding/conveying roller 1. The silicone-modified EPDM was SEPX-1411-U (product of product of Shin-Etsu Chemical Co., Ltd.). The silicone-modified EPDM was contained in an amount of 100 parts (89.74 wt. %), the foaming agent 3 parts (2.69 wt. %), and the vulcanizing agent 0.72 parts (0.65 wt. %), with respect to the entire amount (111.43 parts) of the unvulcanized rubber composition $C_2$.

Comparative Example 1

In Comparative Example 1, the procedure of Example 1 was repeated, except that EPDM1 and EPDM2 were used as rubber materials, to thereby produce the paper-sheet-feeding/conveying roller 1. EPDM1 was JSR EP-98A (product of JSR Corporation), and EPDM2 was Mitsui EPT-X-3042EH (product of Mitsui Chemicals, Inc.). EPDM1 was contained in an amount of 73 parts (27.3 wt. %), EPDM2 143 parts (53.4 wt. %), the foaming agent 6 parts (2.2 wt. %), and the vulcanizing agent 1.5 parts (0.6 wt. %), with respect to the entire amount (276.8 parts) of the unvulcanized rubber composition $C_2$.

Comparative Example 2

In Comparative Example 2, the procedure of Example 1 was repeated, except that EPDM1 was used as a rubber material, to thereby produce the paper-sheet-feeding/conveying roller 1. EPDM1 was JSR EP-98A (product of JSR Corporation). EPDM1 was contained in an amount of 187 parts (81.7 wt. %), the foaming agent 6 parts (2.6 wt. %), and the vulcanizing agent 1.6 parts (0.7 wt. %), with respect to the entire amount (228.9 parts) of the unvulcanized rubber composition $C_2$.

Test Example 1

Durability Test Under Accelerated Conditions

Figure 5:
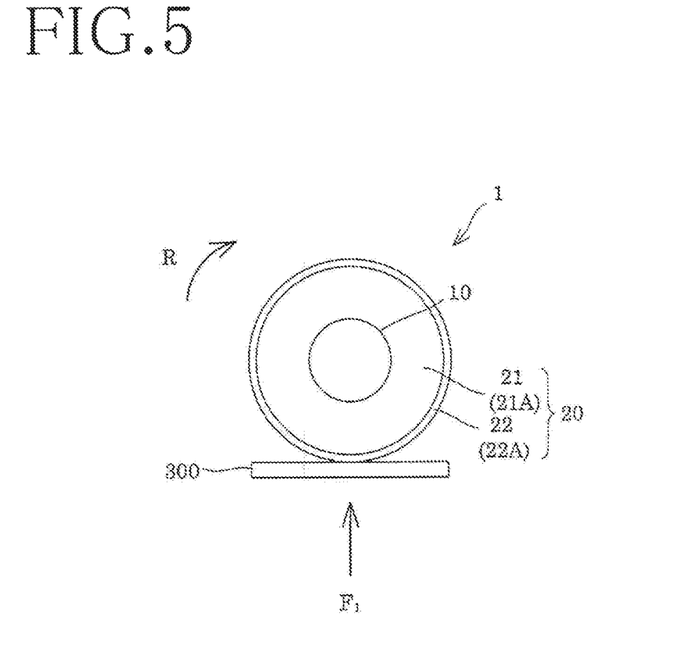
FIG. 5 A sketch of illustrating a procedure of Test Example 1.

FIG. 5 is a sketch of illustrating the procedure of Test Example 1. As shown in FIG. 5, each of the paper-sheet-feeding/conveying rollers 1 produced in Examples 1 to 4 and Comparative Examples 1 and 2 was placed on a metal plate 300, and the metal plate 300 was pressed against the paper-sheet-feeding/conveying roller 1 at a load $F_1$ of (800 gf), and the roller was rotated toward the direction R at 200 rpm, until the foamed elastic layer 21A of the paper-sheet-feeding/conveying roller 1 was broken. The time to the breakage (breaking time) was measured. Table 1 shows the results. In Test Example 1, the time of rotation was limited to 60 minutes (3,600 seconds). In the case where a sample was not broken by rotation for 60 minutes, the breaking time was evaluated as 3,600 seconds. Table 1 shows the results.

Test Example 2

Determination of Deformation Amount

Figure 6:
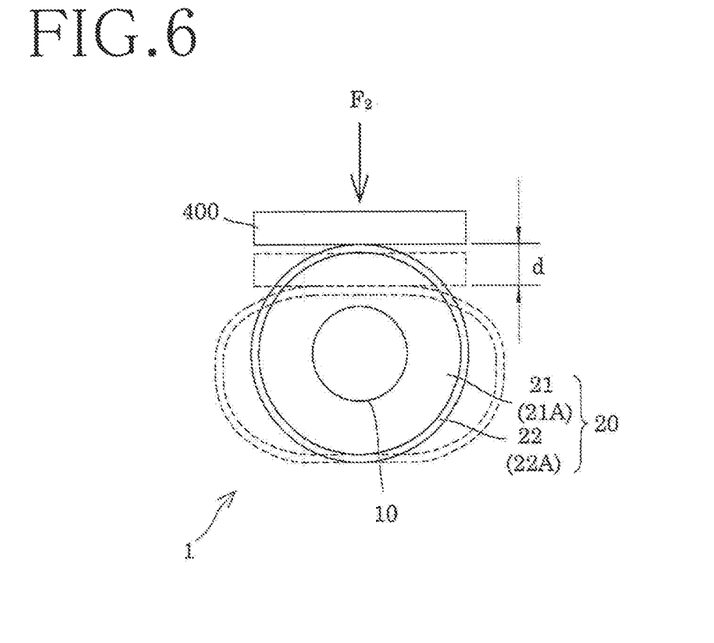
FIG. 6 A sketch of illustrating a procedure of Test Example 2.

FIG. 6 is a sketch of illustrating the procedure of Test Example 2. As shown in FIG. 6, each of the paper-sheet-feeding/conveying rollers 1 produced in Examples 1 to 4 and Comparative Examples 1 and 2 was placed on a metal plate 400, and the metal plate 400 was pressed against the paper-sheet-feeding/conveying roller 1 at a load $F_2$ of (50 g, 100 g, 200 g, 500 g, and 1,000 g). The amount of deformation under pressing (deformation amount) d was measured, to thereby obtain a deformation amount d to each load $F_2$. Table 1 shows the results.

TABLE 1

| | | Ex. 1 | Ex. 2 | Ex. 3 | Ex. 4 | Comp. Ex. 1 | Comp. Ex. 2 |
|---|---|---|---|---|---|---|---|
| Breaking time [s] | | 1,250 | 3,600 | 3,600 | 3,600 | 38 | 56 |
| Deformation amount d [mm] | 50 g | 0.29 | 0.17 | 0.11 | 0.11 | 0.15 | 0.12 |
| | 100 g | 0.49 | 0.31 | 0.22 | 0.19 | 0.32 | 0.22 |
| | 200 g | 0.80 | 0.52 | 0.37 | 0.29 | 0.50 | 0.35 |
| | 500 g | 1.31 | 0.93 | 0.76 | 0.58 | 0.90 | 0.79 |
| | 1,000 g | 1.66 | 1.32 | 1.21 | 0.96 | 1.41 | 1.19 |

Test Example 3

Measurement of Mechanical Properties

By use of the unvulcanized rubber composition $C_2$ for producing the foamed elastic layer 21A of each of the paper-sheet-feeding/conveying rollers 1 produced in Examples 1 to 4 and Comparative Examples 1 and 2, test pieces were prepared. Each test piece was subjected to various mechanical tests. Table 2 shows the results. These mechanical properties were measured in accordance with JIS K 6249:2003. Each of the prepared test pieces was thermally treated at 170° C. for 25 minutes in primary vulcanization. In Test Example 3, secondary vulcanization was omitted. However, a heat treatment at 100° C. for 22 hours was performed in the case of compression set measurement. The rubber hardness of each test piece was measured by means of a durometer (type A).

TABLE 2

| | Ex. 1 | Ex. 2 | Ex. 3 | Ex. 4 | Comp. Ex. 1 | Comp. Ex. 2 |
|---|---|---|---|---|---|---|
| Rubber hardness [°] | 21 | 25 | 35 | 50 | 25 | 35 |
| Impact resilience [%] | 74 | 75 | 76 | 59 | 81 | 84 |
| Tensile strength [MPa] | 7.7 | 4.6 | 5.2 | 6.8 | 2.5 | 2.9 |
| Elongation at break [%] | 670 | 580 | 550 | 560 | 500 | 450 |
| Tear strength [kN/m] | 17 | 15 | 15 | 17.5 | 12 | 12 |
| Compression set [%] | 25 | 20 | 22 | 26 | 14 | 17 |

Considerations

In the paper-sheet-feeding/conveying rollers 1 of Examples 1 to 4, the inner layer 21 of the bi-layer roller material 20 corresponded to the foamed elastic layer 21A formed of the foamed elastic body produced from the unvulcanized rubber composition $C_2$ to be vulcanized containing silicone-modified EPDM and the foaming agent. In contrast, in the paper-sheet-feeding/conveying rollers 1 of Comparative Examples 1 and 2, the inner layer 21 of the bi-layer roller material 20 corresponded to the foamed elastic layer 21A formed of the foamed elastic body produced from the unvulcanized rubber composition $C_2$ to be vulcanized containing EPDM and the foaming agent. As a result, as shown in Table 1, durability of the rollers of Examples 1 to 4 was found to be higher than that of the rollers of Comparative Examples 1 and 2 through comparison in terms of breaking time. The deformation amount d under each load $F_2$ was almost the same in Examples 1 to 4 and Comparative Examples 1 and 2.

As shown in Table 2, mechanical properties of the paper-sheet-feeding/conveying rollers 1 of Examples 1 to 4 were compared with those of Comparative Examples 1 and 2. Impact resilience was higher in Comparative Examples 1 and 2, but tensile strength, elongation at break, tear strength, and compression set were more excellent in Examples 1 to 4. Particularly, the test samples of Examples 2 and 3 (rubber hardness: 25°, 35° exhibited greater elongation at break and significantly enhanced mechanical strength values (i.e., tensile strength and tear strength), as compared with the test samples of Comparative Examples 1 and 2 (rubber hardness: 25°, 35°. Thus, conceivably, enhancement in elongation at break provided enhanced mechanical strength; i.e., enhancement in durability of rollers of Examples 1 to 4.

Notably, the paper-sheet-feeding/conveying rollers 1 of Examples 1 to 4 exhibited no chipping or cracking at mold releasing, but the paper-sheet-feeding/conveying rollers 1 of Comparative Examples 1 and 2 were broken at mold releasing. Conceivably, the feature also indicated enhancement in durability of rollers of Examples 1 to 4 by enhancement in elongation at break and mechanical strength.

Also, In the paper-sheet-feeding/conveying roller 1 of Example 2, the foamed elastic layer 21A was formed from the unvulcanized rubber composition $C_2$ containing silicone-modified EPDM and EPDM (9:1). As described above, durability in Example 2 was almost equivalent to that in Examples 1, 3, and 4.

Therefore, through producing the foamed elastic layer 21A of the paper-sheet-feeding/conveying roller 1 from the unvulcanized rubber composition $C_2$ containing silicone-modified EPDM or that containing silicone-modified EPDM and EPDM at a specific ratio, there can be provided a paper-sheet-feeding/conveying roller 1 having enhanced durability, which roller has an excellent mechanical strength to ensure use under severe feeding and conveying conditions.

INDUSTRIAL APPLICABILITY

The present invention is widely applicable to rollers for various OA machines such as a copying machine, a facsimile, and printers, as well as rollers for conveying cards and paper sheets employed in printers for printing on cards (e.g., a telephone card, a prepaid card, and a cash card) or paper sheets (e.g., paper money and tickets), financial terminal machines (e.g., automatic teller machine (ATM) and cash dispenser (CD)), an automatic ticket gate, etc. Among these uses, the paper-sheet-feeding/conveying roller of the present invention is suitably employed as rollers for OA machines (e.g., a paper-feeding roller, a conveying roller, a charge-imparting roller, a development roller, a transfer roller, and a press roller). Particularly preferably, the roller of the present invention is employed in feeding and conveying paper sheets.

DESCRIPTION OF THE DRAWINGS

1 paper-sheet-feeding/conveying roller
10 shaft
20 bi-layer roller material
21 inner layer
21A foamed elastic layer
21B unfoamed elastic layer
22 outer layer
22A elastic layer
22B tube member
100 axis-aligned metallic shaft
200 first metal mold
201 bottom surface
202 top end
210 second metal mold
220 third metal mold
300, 400 metal plate

The invention claimed is:

1. A paper-sheet feeding or conveying roller, comprising:
    a shaft; and
    a bi-layer roller material, which is formed of an inner layer provided on the shaft and an outer layer,
   wherein:
    the inner layer provided on the shaft is a foamed elastic layer,
    the outer layer provided on the foamed elastic layer is a non-foamed elastic layer,
    the foamed elastic layer is formed of a foamed elastic body of silicone-modified EPDM,
    the non-foamed elastic layer contains EPDM,
    an amount of silicon compound used in the silicone-modified EPDM, with respect to 100 parts by weight of EPDM, is 0.1 parts to 100 parts,
    the foamed elastic layer has a rubber strength (Asker C) of 10° to 50°, and
    the foamed elastic layer has elongation at break (JIS K 6249) of 550% to 670%.

* * * * *